US009967245B2

(12) United States Patent
Truong

(10) Patent No.: US 9,967,245 B2
(45) Date of Patent: May 8, 2018

(54) USER AUTHENTICATION USING UNIQUE HIDDEN IDENTIFIERS

(71) Applicant: Brian A. Truong, Cerritos, CA (US)

(72) Inventor: Brian A. Truong, Cerritos, CA (US)

( * ) Notice: Subject to any disclaimer, the term of this patent is extended or adjusted under 35 U.S.C. 154(b) by 0 days. days.

(21) Appl. No.: 15/051,472

(22) Filed: Feb. 23, 2016

(65) Prior Publication Data

US 2016/0173480 A1 Jun. 16, 2016

Related U.S. Application Data

(63) Continuation of application No. 14/204,813, filed on Mar. 11, 2014, now Pat. No. 9,306,926.

(60) Provisional application No. 61/790,449, filed on Mar. 15, 2013.

(51) Int. Cl.
| | |
|---|---|
| *G06F 7/04* | (2006.01) |
| *H04L 9/32* | (2006.01) |
| *H04L 29/06* | (2006.01) |
| *H04W 4/08* | (2009.01) |
| *H04W 8/18* | (2009.01) |
| *G06Q 50/00* | (2012.01) |
| *H04W 12/02* | (2009.01) |
| *H04M 3/42* | (2006.01) |
| *H04W 12/06* | (2009.01) |

(52) U.S. Cl.
CPC ............ *H04L 63/08* (2013.01); *G06Q 50/01* (2013.01); *H04L 63/0407* (2013.01); *H04L 63/0414* (2013.01); *H04L 63/0421* (2013.01); *H04L 63/102* (2013.01); *H04M 3/42008* (2013.01); *H04W 4/08* (2013.01); *H04W 8/186* (2013.01); *H04W 12/02* (2013.01); *H04W 12/06* (2013.01)

(58) Field of Classification Search
CPC ..... G06Q 50/01; H04L 63/08; H04L 63/0407; H04L 65/403; H04L 63/0414; H04L 63/0421; H04L 12/1813; H04L 12/1818; H04L 12/1822; H04W 12/06; H04W 12/02; H04W 4/08; H04W 8/186; H04M 3/42008; G06F 17/30725
See application file for complete search history.

(56) References Cited

U.S. PATENT DOCUMENTS

| | | |
|---|---|---|
| 5,818,836 A | 10/1998 | DuVal |
| 6,744,869 B2 | 6/2004 | Brockenbrough et al. |
| 6,938,022 B1 | 8/2005 | Singhal |
| 7,533,418 B1 | 5/2009 | Yoakum et al. |
| 7,587,197 B2 | 9/2009 | Kimbrell |
| 7,859,560 B1 * | 12/2010 | Issa ..................... H04L 12/1827 348/14.01 |
| RE42,828 E | 10/2011 | Liu et al. |
| 8,060,529 B2 | 11/2011 | Hu et al. |
| 8,200,819 B2 | 6/2012 | Chung et al. |
| 8,256,664 B1 | 9/2012 | Balfanz et al. |
| 8,438,633 B1 | 5/2013 | Backholm et al. |
| 2001/0056359 A1 | 12/2001 | Abreu |
| 2002/0027901 A1 | 3/2002 | Liu et al. |
| 2002/0107776 A1 | 8/2002 | Bove et al. |

(Continued)

*Primary Examiner* — Michael Simitoski
(74) *Attorney, Agent, or Firm* — One LLP; Joseph K. Liu

(57) ABSTRACT

Systems and methods are provided for user authentication using hidden unique identifiers in networks. In some example embodiments these systems and methods only require a single human readable identifier be provided and minimize personal information exposure in the event of a network breach.

9 Claims, 11 Drawing Sheets

(56) References Cited

U.S. PATENT DOCUMENTS

| | | | |
|---|---|---|---|
| 2003/0084165 A1* | 5/2003 | Kjellberg | H04L 63/08 709/227 |
| 2004/0203619 A1 | 10/2004 | Tissot | |
| 2004/0210770 A1 | 10/2004 | Sanin et al. | |
| 2004/0215784 A1 | 10/2004 | Qi et al. | |
| 2005/0132189 A1 | 6/2005 | Katsube et al. | |
| 2005/0174975 A1* | 8/2005 | Mgrdechian | G06Q 30/0207 370/338 |
| 2005/0198197 A1 | 9/2005 | Yoshiuchi et al. | |
| 2005/0216300 A1 | 9/2005 | Appelman et al. | |
| 2006/0015503 A1 | 1/2006 | Simons et al. | |
| 2007/0161382 A1 | 7/2007 | Melinger et al. | |
| 2007/0224998 A1 | 9/2007 | Kimbrell | |
| 2008/0005664 A1 | 1/2008 | Chandra | |
| 2008/0064374 A1* | 3/2008 | Coffing | G06Q 10/10 455/414.1 |
| 2008/0114867 A1 | 5/2008 | Thayer et al. | |
| 2008/0163312 A1 | 7/2008 | Faust et al. | |
| 2009/0055904 A1* | 2/2009 | Gomi | H04L 63/08 726/4 |
| 2009/0234910 A1 | 9/2009 | Chung et al. | |
| 2009/0248807 A1 | 10/2009 | Fron et al. | |
| 2010/0063889 A1* | 3/2010 | Proctor, Jr. | G06Q 30/0623 705/21 |
| 2010/0319062 A1 | 12/2010 | Danieli et al. | |
| 2012/0211557 A1 | 8/2012 | Harris | |
| 2012/0226701 A1 | 9/2012 | Singh | |
| 2013/0043302 A1 | 2/2013 | Powlen et al. | |
| 2013/0061333 A1 | 3/2013 | Davis et al. | |
| 2013/0179491 A1* | 7/2013 | Bennett | H04L 65/1076 709/203 |
| 2013/0198281 A1* | 8/2013 | Scuba | H04L 67/18 709/204 |
| 2013/0205360 A1* | 8/2013 | Novak | H04L 63/0884 726/1 |
| 2013/0218983 A1* | 8/2013 | Richard | H04W 12/02 709/206 |
| 2014/0013446 A1* | 1/2014 | Patvarczki | H04L 67/24 726/28 |
| 2014/0032772 A1* | 1/2014 | Tijssen | G06Q 50/01 709/228 |
| 2014/0052576 A1* | 2/2014 | Zelenka | G06Q 30/00 705/26.41 |
| 2014/0122517 A1* | 5/2014 | Vendrow | G06F 17/30557 707/769 |
| 2014/0158760 A1* | 6/2014 | Seker | G06F 17/30943 235/380 |
| 2015/0288671 A1* | 10/2015 | Chan | H04L 63/0227 726/1 |

* cited by examiner

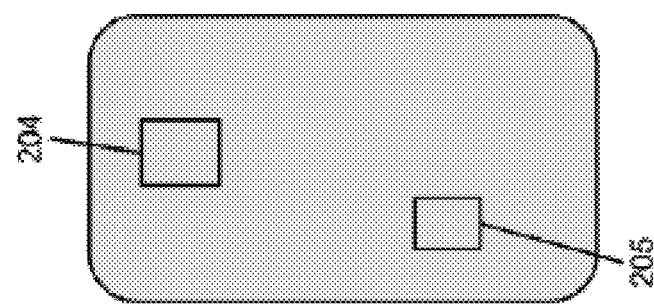
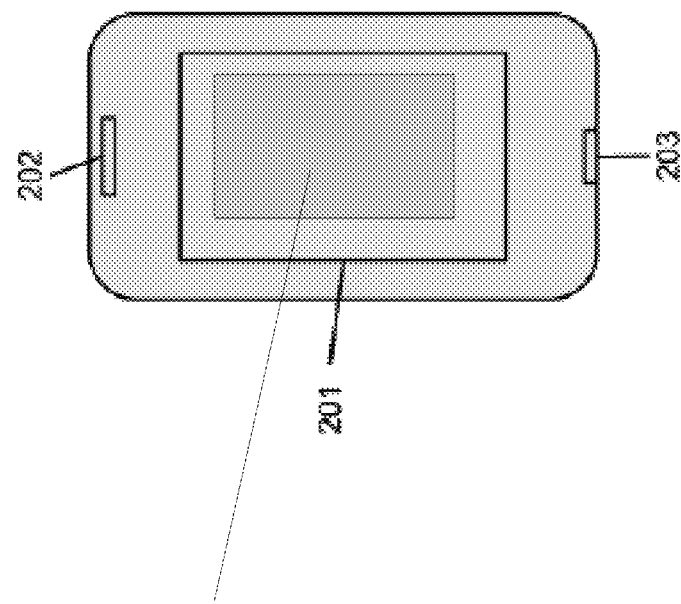
Figure 2

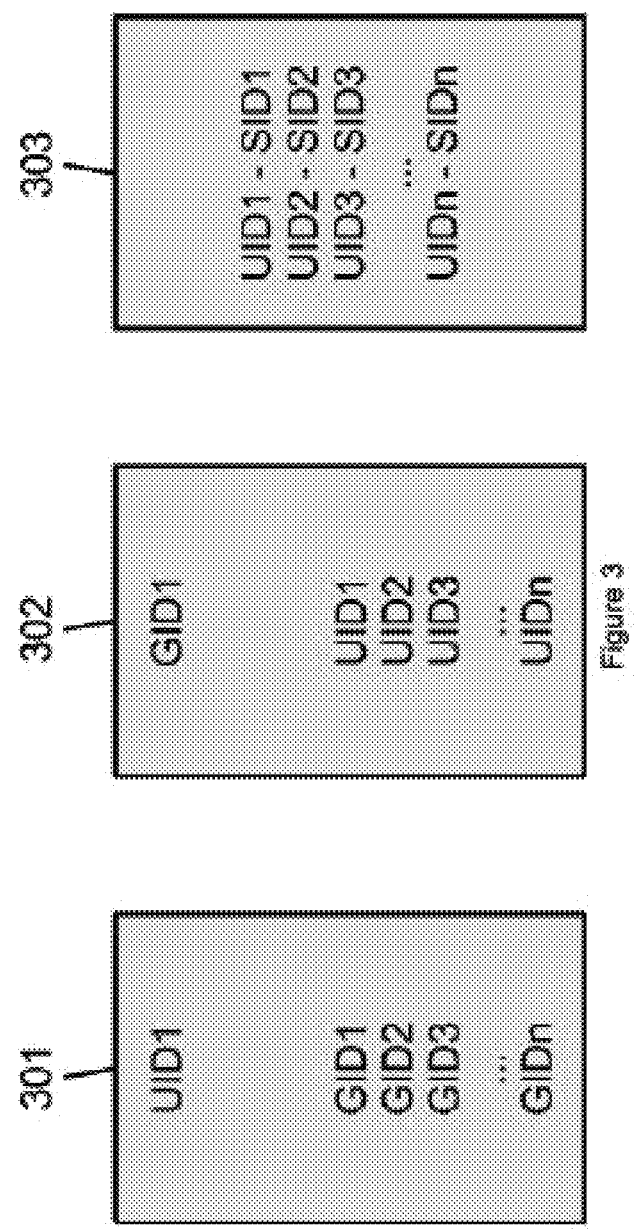

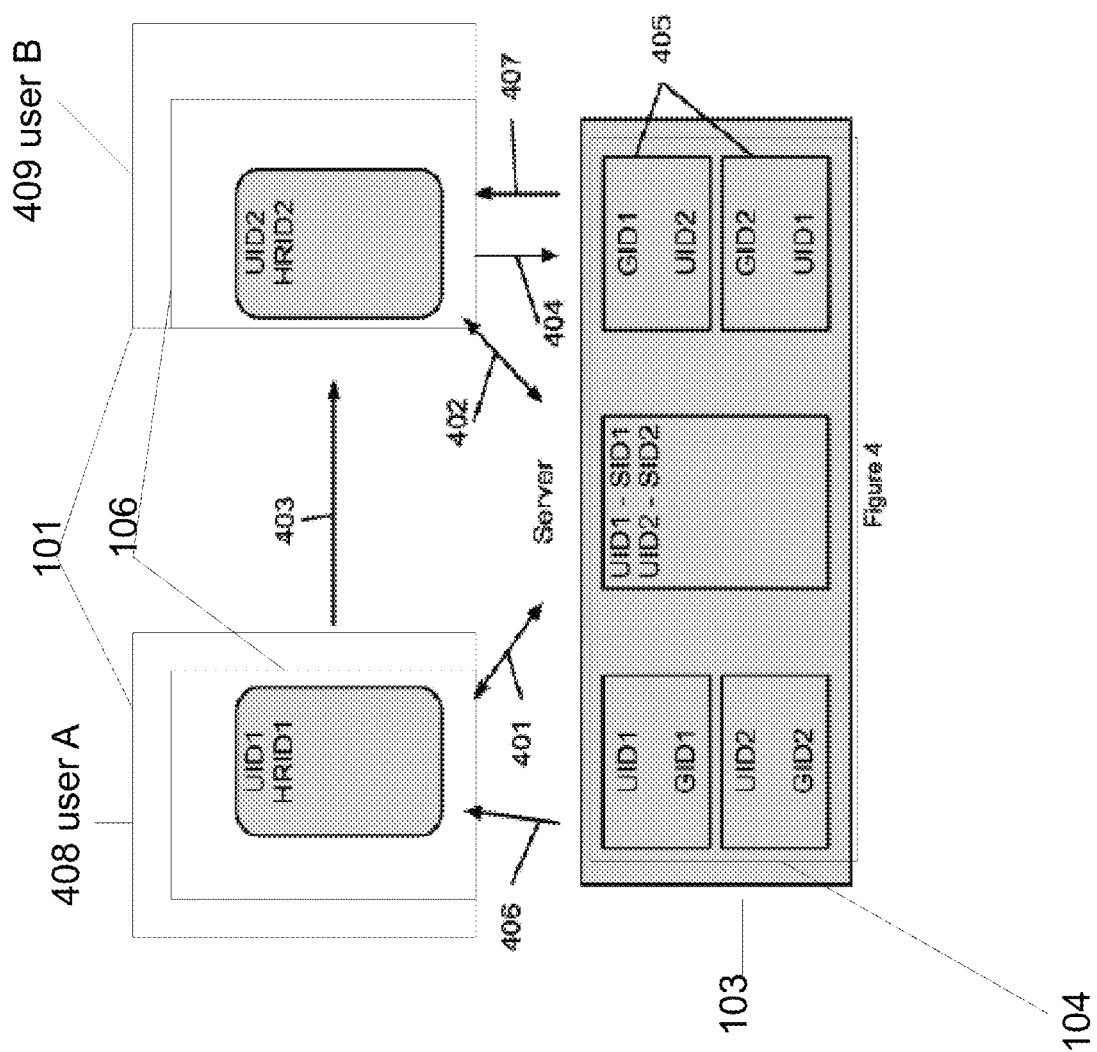

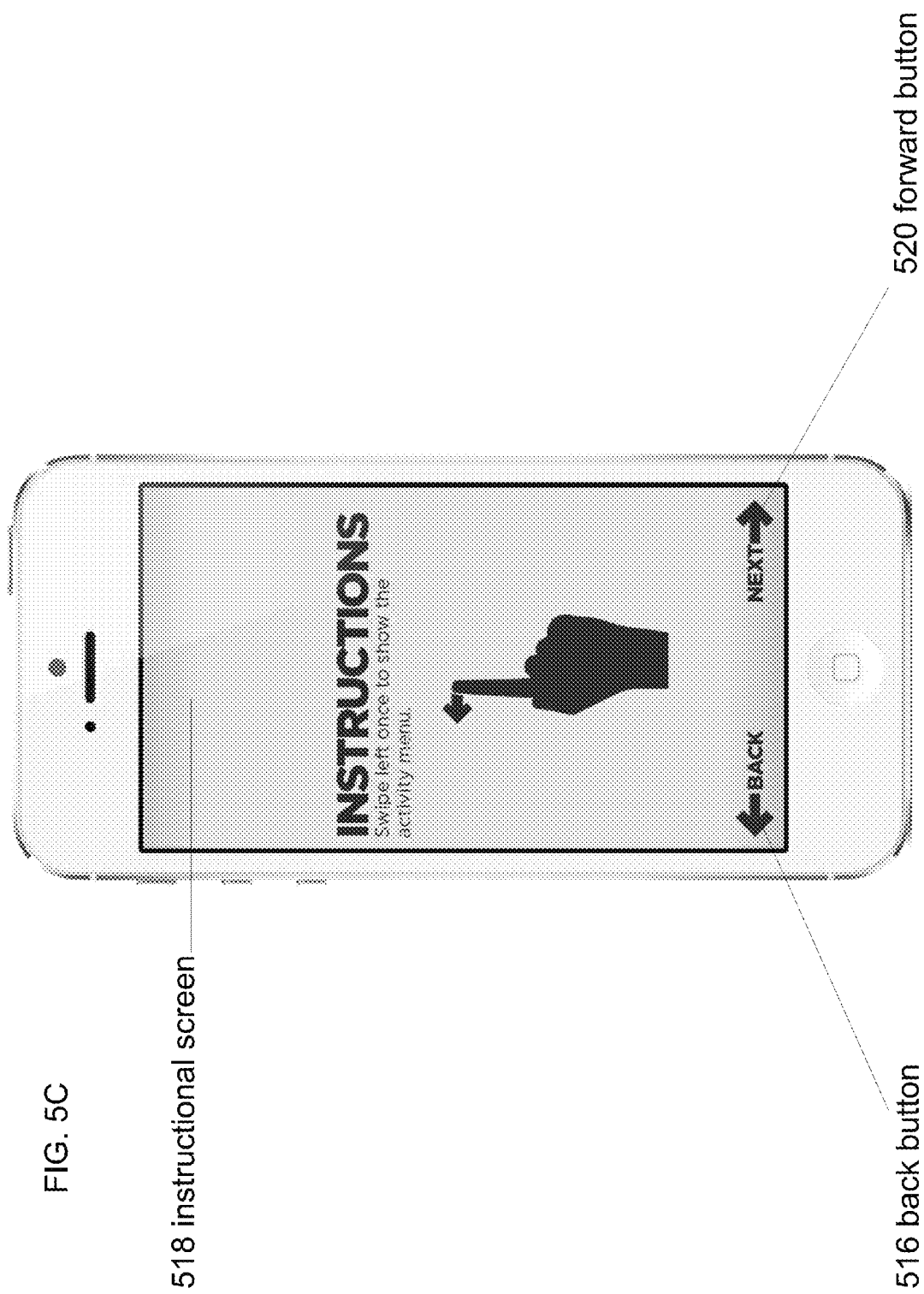

USER AUTHENTICATION USING UNIQUE HIDDEN IDENTIFIERS

CROSS-REFERENCE TO RELATED APPLICATIONS

The present application is a continuation of U.S. patent application Ser. No. 14/204,813 filed Mar. 11, 2014, which claims priority to U.S. Provisional Application No. 61/790,449 filed Mar. 15, 2013, both of which are hereby incorporated by reference in their entirety.

FIELD

The subject matter described herein relates generally to a system and method for identity authentication and safeguarding in computer networks.

BACKGROUND

In current computer networks, the users of a network need to be authenticated to prevent misuse and impersonations. Since computers were traditionally large and heavy, they were fixed in their location and users would move about to different computers. Authentication traditionally occurs when a user provides some credentials, such as a user name and password that are then compared to credentials stored in a central database. This allows the user to authenticate his identity from any computer. Numerous problems exist with this method. First, a user needs to remember his credentials but often forgets them, so there needs to be a way to recover the credentials in that case. Second, attackers may simply try all possible combinations of characters to guess the credentials. Third, if an attacker compromises the central database of credentials, the credentials of all the users may be stolen and used to attack other systems.

With the advent of smart phones and smart devices, computers are no longer set in fixed locations. Instead, computers are taken everywhere a user goes.

In current communications networks, the users are usually asked for personally identifiable information such as an email or phone number. This ensures both that the user is unique and that the system can contact the user in the event that the user forgets his credentials.

Some businesses, however, also use the personally identifiable information for monetary gain by selling user information to third parties, or using it for marketing purposes internally. This is a problem for users who do not wish their information to be shared and who do not want unsolicited communications. Users may occasionally opt out of information sharing, but if they do not opt out at the time of account creation, the information cannot be unshared. Some unscrupulous businesses even share information despite a user opting out.

In current communications networks, users usually find each other by sharing the unique identifier used by the network, typically an email address, phone number or user name. Once two users are linked on the communication network, the identifier of one user is known to the other. If one user wishes to sever the connection with another user, he has to actively block the other user since the other user can use the identifier of the first user to reconnect or stalk the first user. If the other user creates a new account, the first user has to block that new account also.

When the device is used to store the user's credentials instead of the user's memory, longer and more complex sets of credentials may be used to authenticate a user in a network. Storing the credentials on the device also removes the need for the user to authenticate every time a connection is made to the network, the device can automatically authenticate itself. The user need only be authenticated once when the account is created and each time a connection is made to another user.

The portability of the device allows users to authenticate other users either in person or using real time communications such as a videoconference or telephone call. This makes authentication more difficult to fake.

A database of unique identifiers where the only personally identifiable information saved is the user's name is preferable to one which stores email, telephone numbers or other personal information, especially when the name is not required to be the user's real name. If the database is compromised, an attacker can only use this information to determine connections between users since the user's real identifying information is never used in the network.

The invention described herein is a communication network that tries to solve the problems described above using portable smart devices and random unique identifiers. The use of random unique identifiers provides many levels of separation between identifying information, association information, and other information within the network.

SUMMARY

Provided herein are embodiments of a method and system of user authentication in a computer network. The embodiments are described generally and may be applied in government, commercial, educational, personal, or other networks to provide greater protection for network user identities.

Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 2 is a diagram depicting a typical device for use in a typical network in accordance with the present invention.

FIG. 3 is a diagram depicting data components stored on the server in a typical network in accordance with the present invention.

FIG. 4 is a process diagram depicting the process of adding new contacts to a personal contact list in accordance with the present invention.

FIG. 5C is an example embodiment of an instruction screen in accordance with the present invention.

DETAILED DESCRIPTION

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

As used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

Figure 1:
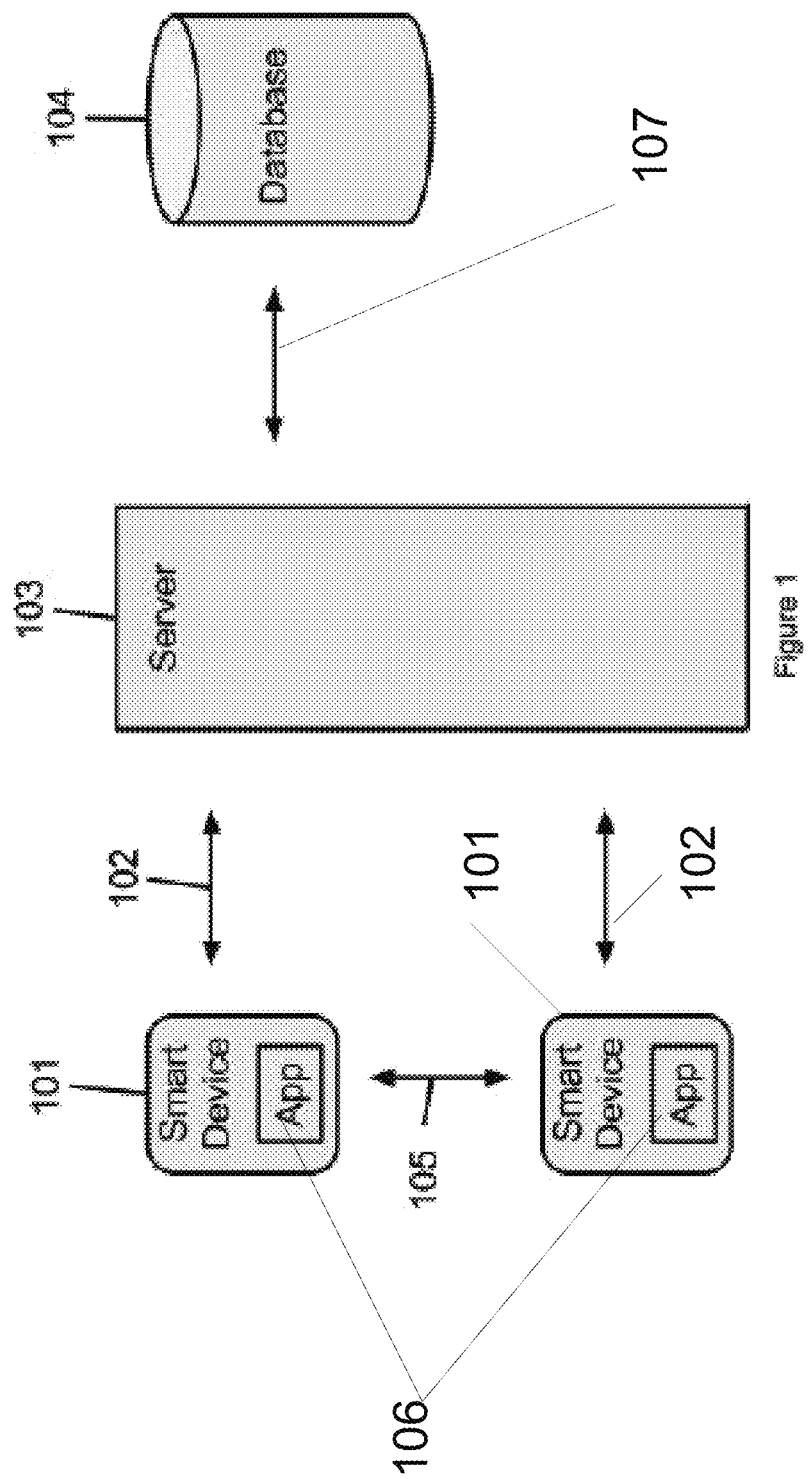
FIG. 1 is a block diagram depicting an example embodiment of a typical network architecture in accordance with the present invention.

Turning to FIG. 1, a block diagram depicting an example embodiment of a network architecture 100 in accordance with the present invention is shown. Network architecture 100 has numerous components including smart device 101, server 103, and database 104. In the example embodiment smart device 101 runs App 106. Also depicted are electronic connection 102 between smart device 101 and server 103, device bridge 105, and server to database connection 107.

Device 101 (also referred to herein as smart device 101) may be any device operable to install App 106 and communicate with server 103. In the example embodiment App 106 is a software program. In the example embodiment device 101 is a smart phone but in other embodiments device 101 is a tablet, PDA, laptop PC, desktop PC, or other smart device.

Server 103 is a system of hardware and/or software that provides a network service in a computer network. In a typical embodiment server 103 operates to serve the request of clients, in this case device 101s.

Database 104 is a collection of data that is organized. In the example embodiment database 104 keeps track of lists of data such as identifying information for use in networking device 101's.

In some embodiments database 104 is located on server 103. In other embodiments database 104 is located on a second or additional server or servers (not pictured) and is accessible by server 103.

In the example embodiment server 103 is accessible by devices 101. Device 101 runs App 106. Device 101 communicates with server 103 and connection 102 is created between App 106 and server 103. Server 103 assigns a Session ID (SID) to connection 102. SID is a unique random number assigned to connection 102 between App 106 and server 103. SID is valid for the duration of connection 102. If reconnection is required due to a break in service such as a disconnection a new SID is assigned by server 103 to new connection 102.

After receiving SID, device 101 sends its User ID (UID) to server 103. UID is a Universally Unique Identifier (UUID) that is assigned to a user. UUID is a random number used to uniquely identify an object in the network, such as device 101.

In the example embodiment connection 102 is encrypted. In the example embodiment encryption of connection 102 communications is achieved using Secure Sockets Layer (SSL) cryptographic protocol. In other embodiments Transport Layer Security (TLS) and/or other encryption processes and/or protocols are used.

Devices 101 are also operable to communicate with each other over device bridge 105. In some embodiments App 106 provides encryption to serve as an additional level of security for communication over device bridge 105.

Turning to FIG. 2, front and rear views of device 101 are provided which show various elements in accordance with the present invention. In the example embodiment App 106, display 201, camera 204, speaker 202, microphone 203, wireless transceiver 205, power module 207, and central processing unit (CPU) 206 are provided. Some components are located within the device and are not visible from the outside but are shown in the diagram for illustrative purposes.

App 106 is a software application designed to run on device 101.

Display 201 is a display that allows a user to see a visual depiction of the user interface of device 101. In the example embodiment where device 101 is a smart phone display 201 is the smart phone screen that is usually a touchscreen in modern smart phones. In other embodiments display may be a monitor or screen that does not have touchscreen operability.

Camera 201 is an optical instrument that is operable to capture images. In some embodiments these are still images and in some embodiments these are moving images such as video.

Speaker 202 is an audio transducer that is operable to turn electrical signals into audio signals.

Microphone 203 is an audio transducer that is operable to turn audio signals into electrical signals.

Wireless transceiver 205 is a wireless communications setup including an antenna which is operable to enable device 101 to transmit and receive data to communicate with other wireless device 101s and server 103's. In the example embodiment wireless transceiver 205 enables device 101 to communicate over a wireless cellular network such as 2G, 3G, 4G LTE, or others, while in some embodiments wireless transceiver 205 enables device 101 to communicate over a wireless network such as Bluetooth, Wi-Fi, or others.

Power module 207 regulates and provides power to each subsystem and component in device 101 by way of a power source such as a battery or power cord.

Central processing unit (CPU) 206 may be a single processor or a core of processors that are operable to control and carry out computer processes within device 101 and may handle information from some or all other components described above.

In the example embodiment display 201 is displaying a graphical user interface of App 106 in order to allow a user to interact with the device.

Turning to FIG. 3, data components diagram 300 is depicted showing storage of data in database 104. In the example embodiment a first list 301 of associations of UID's to GID's is provided. Group ID's (GID's) are UUID's assigned to a group. A second list 302 of GID's to UID's is also provided. A third list 303 of UID's to SID's is also provided.

Turning to FIG. 4, an example embodiment is shown of interaction between elements of the authentication system when a first user, (hypothetical female) UserA 408, wishes to add a second user, (hypothetical male) UserB 409, to a list of contacts on her device 101. In the example embodiment, App 106s are running on device 101s and are operated by UserA 408 and UserB 409. Database 104 is on server 103. Steps 401-407 occur in sequential order.

Prior to beginning step 401, UserA 408 and User B 409 have installed App 106 on their separate device 101s and created network accounts (as described later).

Step 401: UserA 408 device 101 connects to the server 103, receives SID1 and sends UID1. Server 103 associates UID1 and SID1 in database 104.

Step 402: UserB 409 device 101 connects to server 103, receives SID2 and sends UID2. Server 103 associates UID2 and SID2 in database 104.

Step 403: UserA 408 uses device 101, inputting instructions to add a contact. UserA 408 device 101 transmits add request data including SID1, Human Readable ID1 (HRID1), and contact add request to UserB 409 device 101 using device bridge 105.

In an example embodiment HRID1 is a first and last name. In some embodiments HRID1 may be an alias or other identifying name, word, or title and may be entered in one of the fields provided or additional or different fields as provided.

Step 404: UserB 409 device 101 informs UserB 409 of contact add request including HRID1 which UserB 409 reads as UserA 408's name or alias. If UserB 409 does not recognize HRID1 as someone he wishes to add to his contact list, UserB 409 may reject the contact add request or simply ignore it.

If UserB 409 wishes to confirm the contact add request he selects the appropriate command and UserB 409 device 101 sends confirmation data to server 103 with UserB 409's SID2.

Step 405: Server 103 retrieves UserA 408's UID1 and UserB 409's UID2 using SID1 and SID2 contained in add request data and confirmation data. Server 103 retrieves UserA 408's home group GID1 from database 104 and adds UserB 409's UID2 to home group GID1. Server 103 also retrieves UserB 409's home group GID2 from database 104 and adds UserA 408's UID1 to home group GID2.

Step 406: Server 103 sends to UserA 408's device 101 the HRID2 for UserB 409's account with user index 0 for UserB 409 in UserA 408's home group, group index 0.

Step 407: Server 103 also sends to UserB 409's device 101 HRID1 for UserA 408's account with user index 0 for UserA 408 in UserB 409's home group, group index 0.

Thereafter UserA 408 and UserB 409 reference each other using at least the respective group index and member index as described above.

Initialization

Figure 5A:
FIG. 5A is an example of a user interface of an initialization screen in accordance with the present invention.

Turning to FIG. 5A, an example embodiment of an initialization screen 502 in accordance with the present invention is shown.

When first using App 106 on device 101 an initializing screen 502 is provided in some embodiments to initiate the user into the network. The initialization screen welcomes the user to App 106 and provides the user a chance to create a new account using new account button 504 (taking the user to new account setup screen 508) or to recover an account using recover account button 506 (taking the user to an account recovery screen not pictured). If the user is using App 106 for the first time, user must create a user account and thus selects new account button 504. In some embodiments other buttons or fields may be provided on initialization screen 502.

Figure 5B:
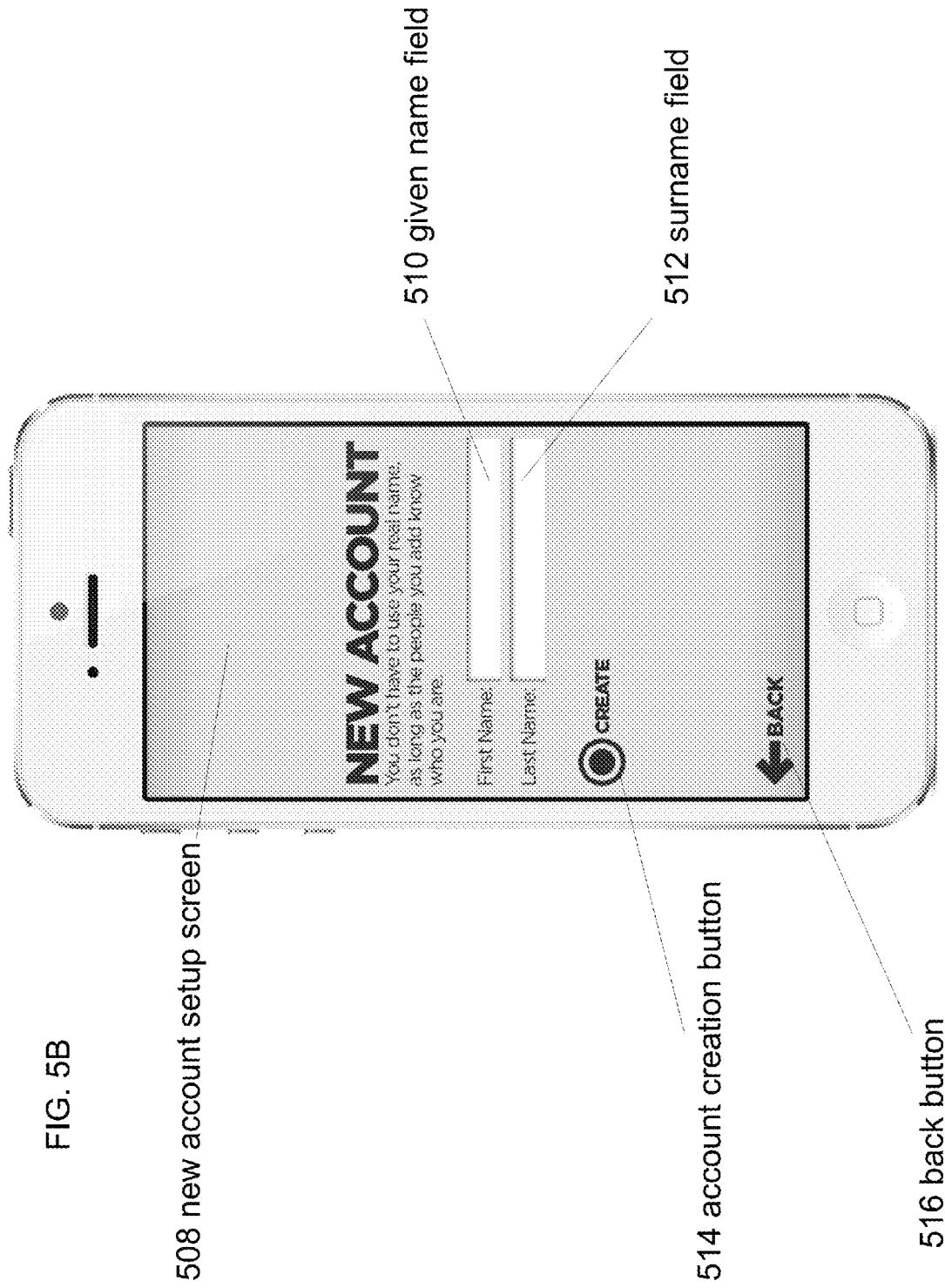
FIG. 5B is an example embodiment of a user interface of a new account setup screen in accordance with the present invention.

Turning to FIG. 5B, new account setup screen 508 is shown. In the example embodiment new account setup screen 508 may have given name field 510, surname field 512, account creation button 514, and back button 516. When creating an account a user, for example UserA 408, chooses a human readable identifier (HRID1). In the example embodiment shown, HRID1 is a first and last name that is entered into given name field 510 and surname field 512 respectively. In some embodiments HRID1 may be an alias or other identifying name, word, or title and may be entered in one of the fields provided or additional or different fields as provided. Device 101 then connects to server 103 and sends HRID1 with a request to create a new account. Server 103 creates a new UID and stores the new UID with HRID1 in database 104. Server 103 also associates the UID with a current SID in database 104. Server 103 also creates a new home group GID and associates the UID with the GID in database 104. Server 103 then sends the new UID back to device 101 and App 106 stores the new UID. The new user is not aware of new UID and is only aware of HRID1 which user chose when creating the new account.

Similarly, creating a network account allows a second user, UserB 409, to assign his name or alias HRID2 to UserB 409 device 101 in addition to UID2, which is assigned without UserB 409 ever knowing it.

When a new account is created, a home group in App 106 is empty. User must add a new contact in order to communicate with the new contact. Contacts can be added either directly as described above or indirectly as will be described later.

Turning to FIG. 5C, an example embodiment of instructional screen 518 is shown. Instructional screen 518 may include instructions on how to use App 106. In the example embodiment a back button 516 and forward button 520 are provided although others may be provided in some embodiments.

Figure 5D:
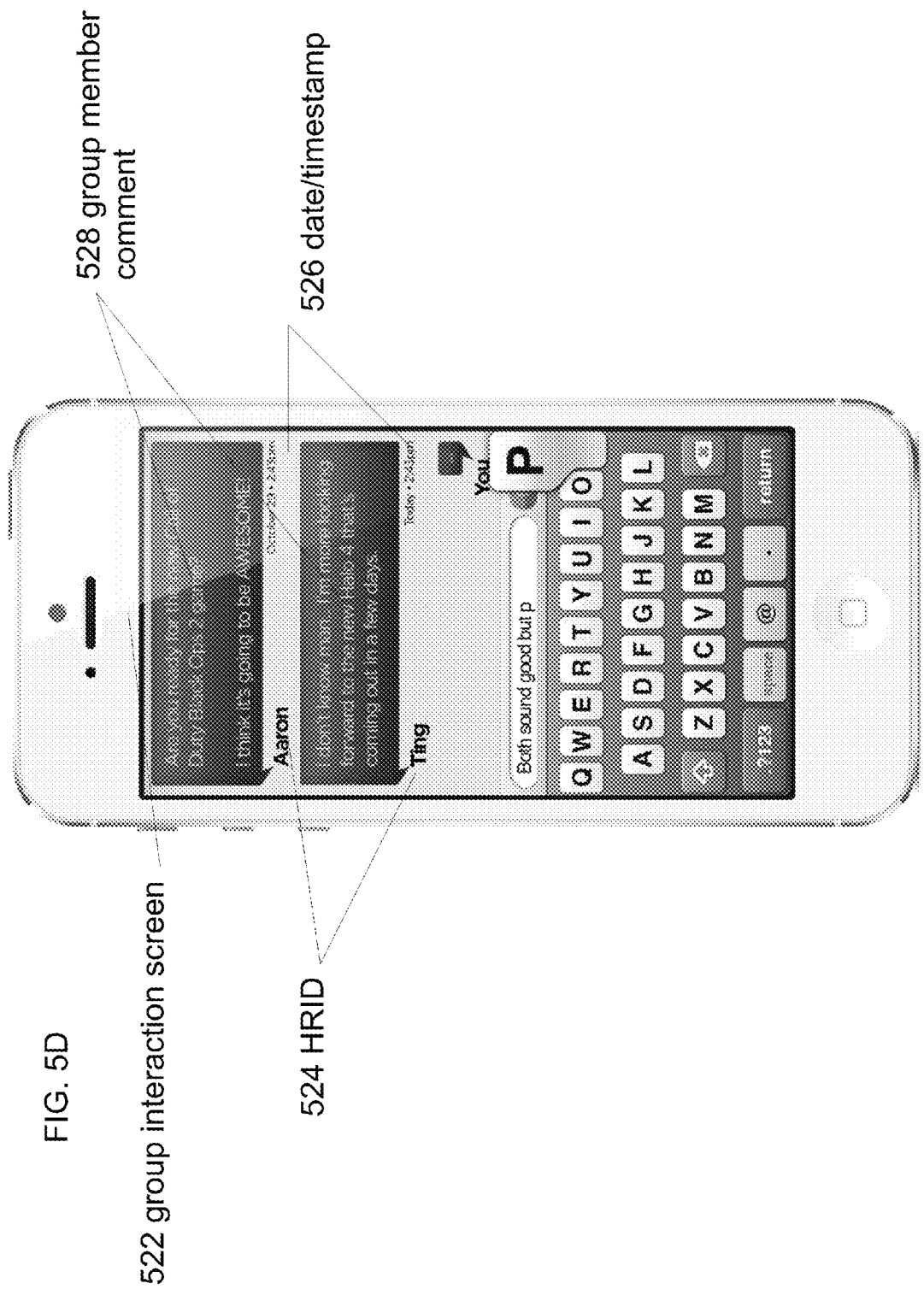
FIG. 5D is an example embodiment of a user interface of a group interaction screen in accordance with the present invention.

Turning to FIG. 5D, an example embodiment of group interaction screen 522 is provided. Group interaction screen 522 in the example embodiment provides several fields including group member comment 528, date/time stamp 526, HRID 524, and is shown in a group chat embodiment. Member comment 528 is a display of a comment by a particular member of the current group interaction screen 522. Member comment 528 is identified by the group member (or user) by HRID 524 so that group members may follow the conversation. Date/time stamp 526 is also provided for convenience to the users. In some embodiments group interaction screen 522 may be a file-sharing screen that identifies or displays files. In other embodiments group interaction screen 522 may be a picture or video-sharing screen. In some embodiments group interaction screen 522 may be a calendar or other group interaction screen.

Figure 5E:
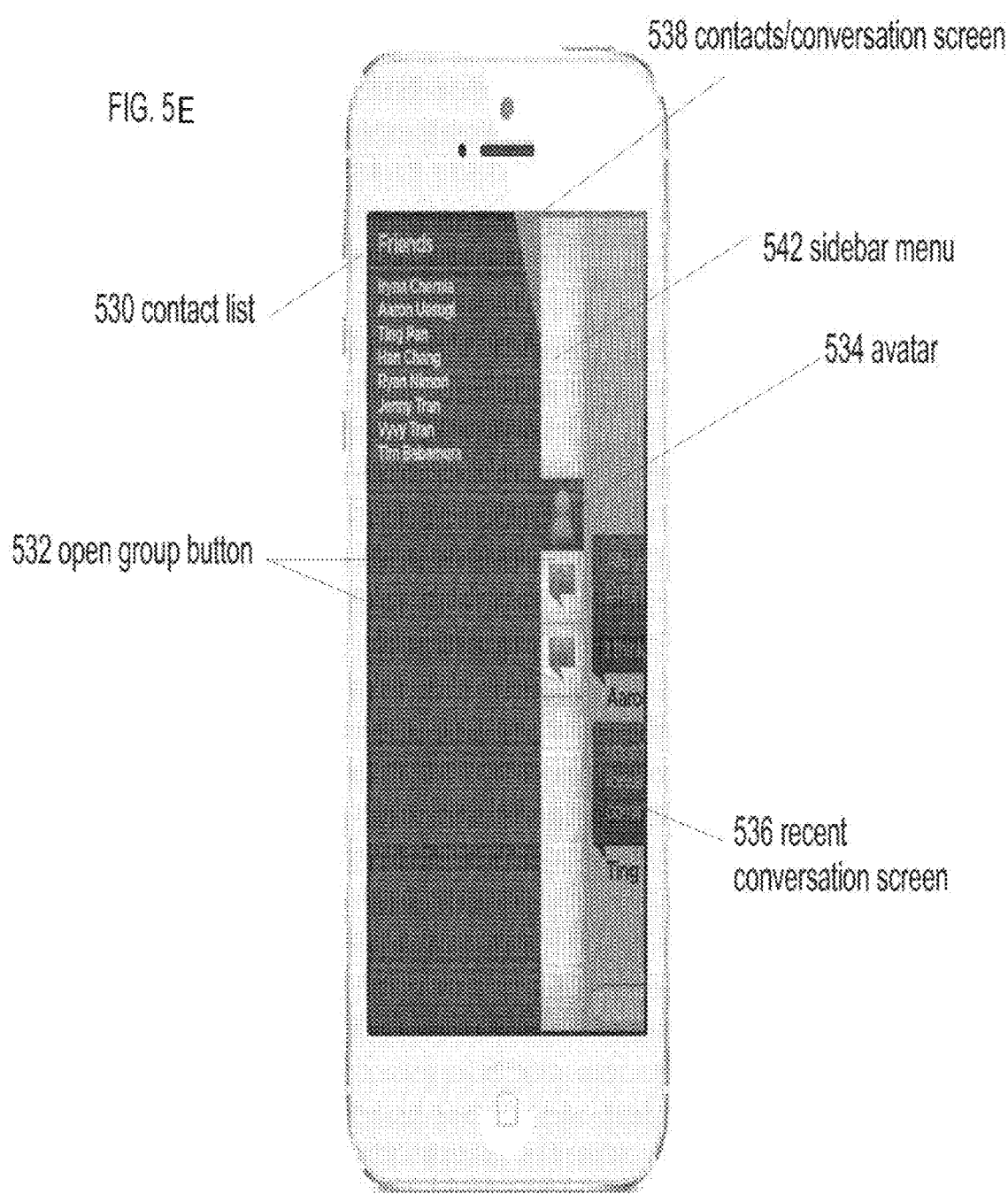
FIG. 5E is an example of a contacts screen in accordance with the present invention.

Turning to FIG. 5E, contacts/conversation screen 538 shows an example embodiment of a user interface of App 106 that allows users quick navigation through multiple screens and simplistic display of important data. Contacts/conversation screen 538 shows contact list 530, recent conversation screen 536, and sidebar menu 542 that includes avatar 534 and open group button 532.

In the example embodiment contact list 530 contains a list of contacts that a user has added to App 106. Likewise, recent conversation screen 536 shows a minimal display of the most recently accessed group interaction screen 522. Sidebar menu 542 shows the user's avatar 534 representing the user and open group button 532's representing groups in which the user is currently a member. In some embodiments sidebar menu may include additional fields or buttons.

In some embodiments contact list may be expanded or shortened, and may include additional fields or buttons such as quick buttons which a user can create to arrange contacts together conveniently. In some embodiments these arrangements may include business contacts, frequent conversation contacts, friend contacts, family contacts, or others. In some embodiments these arrangements may be sent to other users to aid in convenience of sharing contacts and may automatically use the indirect contact adding method described below.

Figure 5F:
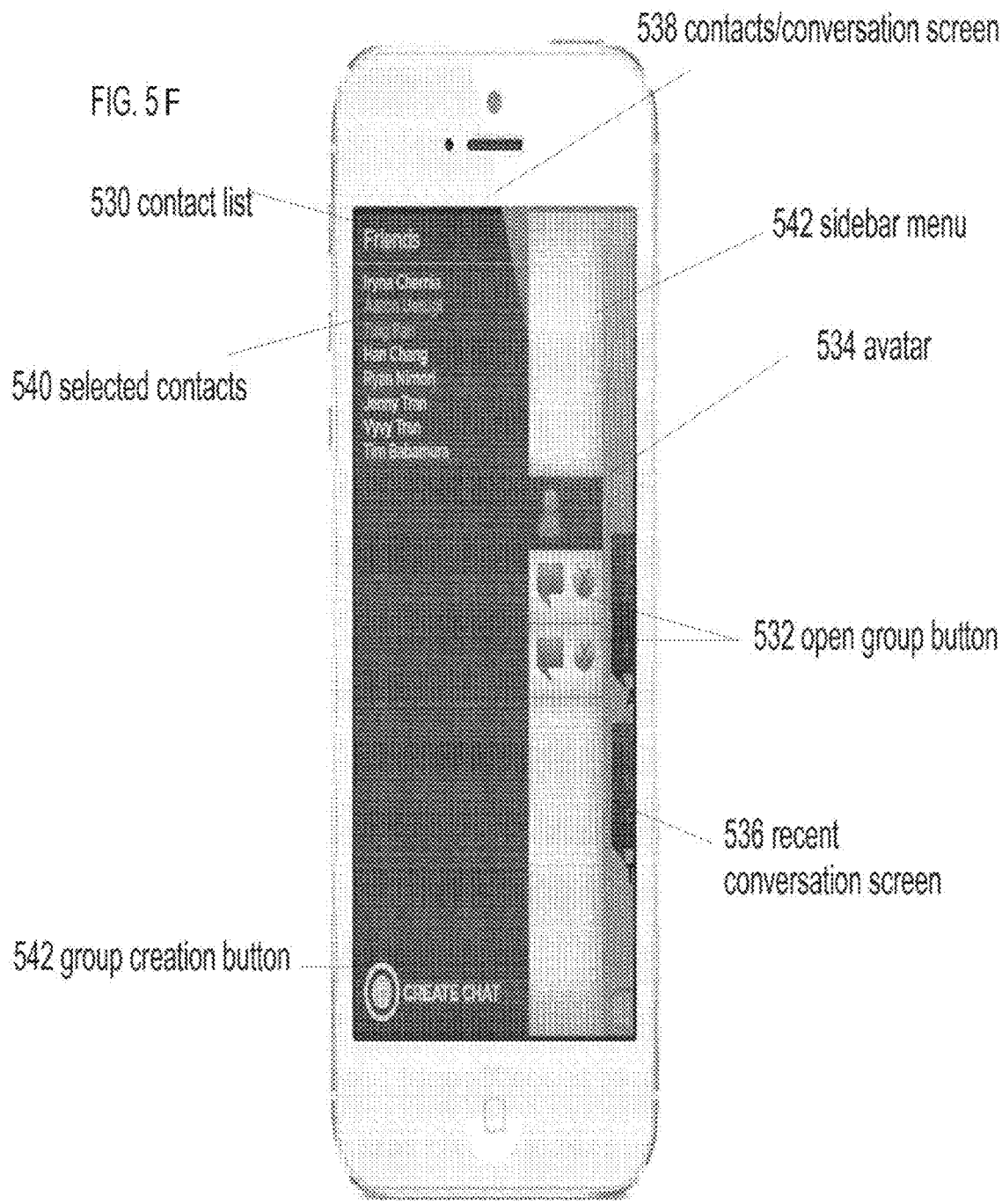
FIG. 5F is an example of a group creation screen in accordance with the present invention.

FIG. 5F shows an example embodiment of contacts/conversation screen 538 in which contact list 530 is being used to create a group. Similar to FIG. 5E, FIG. 5F shows recent conversation screen 536 and sidebar menu 542. Sidebar menu 542 is slightly different in that it allows a user to exit a conversation using open group button 532s instead of having to enter a group interaction screen 522 before leaving a group.

In FIG. 5F, a user has selected contacts 540 from contact list 530 and wishes to create a group. The user then selects group creation button 542.

Creating a Group

User directs App 106 of device 101 to create a new group by selecting group creation button 542. App 106 presents the user with options for a type of communication for the group. The user chooses the type of communication for the group (not shown). App 106 may then prompt the user to select users to add to the group or this may have occurred at a previous step as described above before selecting group creation button 542. Device 101 connects to server 103, sends a group creation request, includes the type of group to create, and includes a list of user indices in the user's home group that correspond to the contacts that the user has selected. Server 103 creates a new group and assigns a new GID. Server 103 looks up the UID's for the user's contacts in database 104 from the list of indices and associates each UID with the new GID. Server 103 sends a notification to each user in the new group indicating that a new group was created, the type of group created, and a list of user HRID's included in the group.

In some embodiments, a group name may be chosen by the group creator and sent with the group creation request. In some embodiments, a group name is created by server 103 and includes the type of group created and the name of a first member of the group (the group creator) prepended to a number of members in the rest of the group (for example "Chat with UserX+1") Thereafter, users are members of the group and can interact with other members of the group using the indices (identified by their respective HRIDs) of the other members.

Indirectly Adding Contacts

In some instances it is beneficial to add contacts indirectly. In some example embodiments it is beneficial to add contacts indirectly if they are not at the same physical location at the time the contacts wish to add each other.

In an example embodiment UserA 408 and UserB 409 are contacts. UserB 409 and UserC are contacts. UserA 408 and UserC are not contacts. UserA 408 wishes to add UserC as a contact but is not able to use the direct method as previously described.

UserB 409 acts as a trusted intermediary for UserA 408 and UserC. UserB 409 creates a new communication group as described above and adds both UserA 408 and UserC. UserB 409 then authenticates their identities by introducing the two using the communication group. As part of the same group, User A 408's App 106 can send UserC's App 106 an add contact request. The data and steps then proceed as in the direct method starting from step 403, but the data for step 403 is transmitted through the network using the communication group instead of device bridge 105. Steps 404 through 407 are the same with the indices of the newly added users reflecting their position in each other's home groups.

Figure 5G:
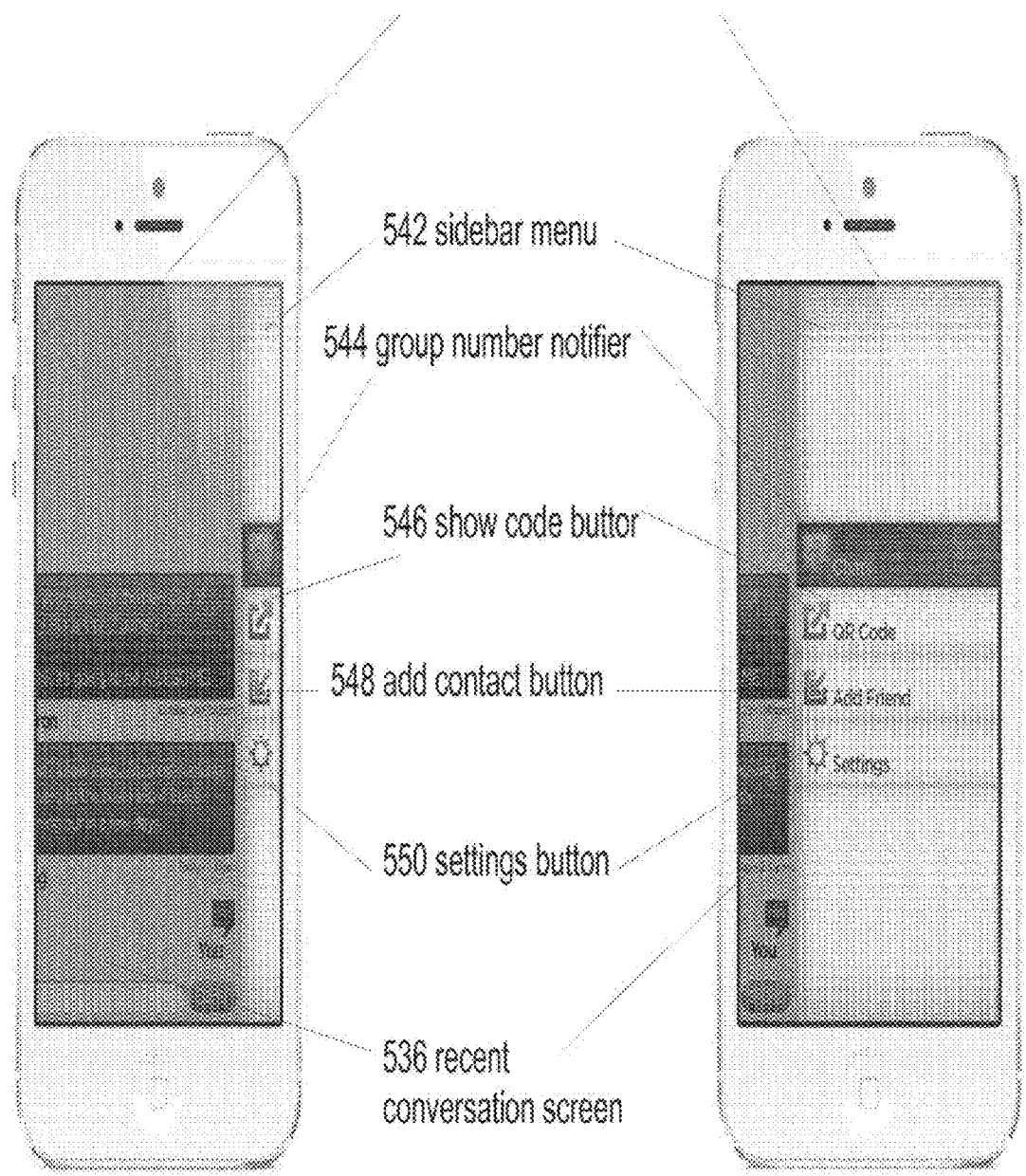
FIG. 5G is an example of the user interface of a group interaction screen in accordance with the present invention.

Turning to FIG. 5G, an example embodiment of group interaction screen 522 is shown with sidebar menu 542 set for simplistic contact adding. In the example embodiment sidebar menu shows group unread messages number notifier 544, show code button 546, add contact button 548, and settings button 550.

In some embodiments users may message each other directly over the network via server 103. In embodiments where users may message each other directly over the network via server 103, messages may be encrypted. In embodiments including encryption a decryption key may be shared over device bridge 105 when a user adds a contact. The decryption key may be shared along with other pertinent data or it may be shared separately.

Group unread messages number notifier 544 may be a number identifying the number of unread messages in the group to the user.

Show code button 546 is a button which a first user may select to show a matrix barcode containing the first user's information if the first user wishes to have a second user's device 101 add the first user as a contact. Show code button 546 in some embodiments may have other uses such as showing a matrix barcode containing other information such as in a commercial or educational context as described below.

Add contact button 548 is a button that a user may select in order to use device 101's camera 204 to scan a matrix barcode from another user's device 101 or otherwise initiate a contact adding process or procedure.

Existing Account Recovery

In some instances a user may lose a device 101, have a device 101 reset, or otherwise lose existing account information. As such, it is beneficial for users to have the opportunity to recover account information rather than create a new account. In order to facilitate account recovery, in some embodiments a user may designate one or more user accounts as trusted accounts. A trusted account may be institutional such as a bank, government office, employer, university, or other. A trusted account may be a personal account such as a friend, colleague, family member, or other user. A trusted account is designated as such because it is allowed to link a new installation of App 106 with an existing account UID.

In an example embodiment UserA 408 previously created an account and added at least two contacts to a home group, UserB 409 and UserC. UserA 408 designated both UserB 409 and UserC as trusted before losing existing account information.

UserA 408 either loses her device or her device was reset. In either case, UserA 408 reinstalls App 106 but lost her original UID. When presented with the option to create a new account or recover an existing one on an initialization screen 502, she chooses the recover account button 506. Recovery requires that trusted contacts UserB 409 and UserC are able to receive data from UserA 408's App 106. In the current embodiment using matrix barcodes or other two-dimensional codes, both UserB 409 and UserC must be present with their devices. UserA 408's app 106 shows a matrix barcode containing an instruction to recover an existing account along with UserA 408's current SID. UserB 409 scans the matrix barcode with his device 101's camera 204. Upon receiving the data, UserB 409's App 106 presents UserB 409 with a list of users for whom UserB 409 is a trusted contact. UserB 409 selects UserA 408's account. UserB 409's App 106 then sends server 103 a recover account request, the user index for UserA 408's account, and UserA 408's SID. Upon receiving the account recover request, server 103 marks UserA 408's account as "In Recovery", meaning it is currently disabled, awaiting a second account recover request.

UserA 408's App 106 shows a matrix barcode containing an instruction to recover an existing account along with UserA 408's current SID. UserC scans the matrix barcode with her device 101's camera 204. Upon receiving the data, UserC's App 106 presents UserC with a list of users for whom UserC is a trusted contact. UserC selects UserA 408's account. UserC's App 106 then sends server 103 a recover account request, the user index for UserA 408's account, and UserA 408's SID. Upon receiving the account recover request, server 103 marks UserA 408's account as "Recovered", meaning the process is complete and server 103 sends UserA 408's App 106 the UID of her existing account.

Single Login for Third Party Systems

In an example embodiment an external third party system may use the identity of a user of the authentication systems disclosed herein as a login into the external third party system. In some embodiments external third party system may be a website, application, or other system.

A user, UserA may open a website or application of the external third party system and initiate a connection to server 103 to receive a SID1. Separately, UserA may concurrently log in or have previously logged in to the system with App 106 and receive SID2. The external third party system may then show a barcode with SID1 and instructions for login into the third party system. UserA scans the barcode using device 101 and device 101 then presents UserA with information such as a login request. UserA may confirm or reject the login request using device 101. Confirmation of the login request causes device 101 to send a login command to server 103 with SID1 and UID1. Server 103 then associates SID1 with UID1 and the third party system is logged in as UID1 without ever knowing UID1. The third party system may then interact with UserA's contacts and groups using the group and member indices as described above.

In some embodiments the server may disassociate UID1 and SID2 when the user logs out of App 106.

Commercial Implementation

In one example embodiment a commercial implementation of this method and system occurs when a retail store creates a group at a specific retail location. Store customers are added to the store location group during a first visit to the store location and can check in again when they arrive at the store location on subsequent occasions. In the example embodiment the store group might take the form of a "frequent buyer club" and the store may wish to reward customer loyalty by sending important information to group members. This information in some embodiments may be information regarding an exclusive sale at the store location. In some embodiments coupons may be sent to group members. When group members check in to the group upon arrival to the store on the subsequent occasion the store is assured that the individual is actually a member of the "frequent buyer club" because they are a member of the group.

In some embodiments a store may also use time limits regarding check ins which expire after a certain time, such as an hour. This prevents a group member from remaining checked in to a location indefinitely. In some time limited embodiments a retail store may wish to only send a message to group members who are actually located in the store and the time limiting helps to ensure this is true.

In other embodiments other limitations such as geographical limitations may be used which automatically remove a user from a group when they leave a specified set of geographical bounds or reach a specified distance from a central group location.

In some embodiments, the number of contacts a user has may be used to qualify the authenticity of the user since each contact added can verify the identity of the user. This also reduces the likelihood of fake accounts because each contact added had to create an account from a valid App 106 and each account itself has a qualitative authenticity. To create a fake account with numerous authentic contacts would require a considerable amount of time and effort and could not be automated easily.

Educational Implementation

In another example embodiment, an educational implementation of this method and system occurs when a teacher creates a group associated with a classroom. In this example embodiment the teacher checks students in when they arrive for class and the method and system can be used to track attendance. The teacher can use the group to share notes or files with the group members who are physically present in the classroom. This may help reduce tardiness or absences because late or absent pupils would not receive the notes which may help in completing assignments if the pupils were not added to the group at the beginning of class.

In another associated example embodiment procrastination of pupils may be cured using the method and system described. In this example embodiment a teacher uses a time limit to limit access to an assignment. If a pupil does not access the group within the specified time limit after the class ended in order to download the assignment then they may be penalized or otherwise negatively impacted.

Educational implementations may also be useful in fostering a learning environment in which pupils are able to type questions to a teacher or other students during a class session. In some embodiments the group would then be dissolved at the end of class and the questions disappear so that those who attended and paid attention are positively impacted by having the full class experience while others may not be positively impacted.

Numerous other collaborative environments may be implemented in App 106 including semi-anonymous groups in which some members may know each other while others do not except for HRID's within a group conversation.

In some embodiments of the invention groups may be shared between contacts. When groups are shared between contacts each member has the ability to approve their own individual connections within the group. In some embodiments users may select multiple other users to add to contact lists and thus avoid having to add users one by one, saving time.

In many embodiments described above the UID of a user is used only once when the user logs in to the network. Subsequent communications with the network are handled using SIDs. This protects communications from eavesdropping or other interception as the SIDs may frequently change as users log in and out of the system. In the same fashion, references to other members of a group are done by index of the group member. Without knowing the order of the group members, an eavesdropper cannot retrieve the member identity from the index.

In many embodiments of the network labels are used for each index and there is no connection between the label and UID.

Once connections are severed within the network they disappear forever and contacts must be added again by direct or indirect method.

Since the user never knows the UID associated with the user device, even if the device is lost or stolen only the HRID is viewable to a finder. Users knowing the HRID of the user who have a lost or stolen device provide a barrier to identity theft since actual knowledge of user identities is required to add contacts in the network. Likewise, anyone hacking into a central database in the network would only access tables of identifiers linked with identifiers since no true personal information is required for authentication other than an HRID.

In some embodiments messages may be stored on the server if the recipient user of the message is not currently connected to the network. In these embodiments the messages are shared only when a connection is made to the server and only in one direction. After the message is sent from the server to the user it is deleted from the server and cannot be recovered.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A non-transitory computer readable medium including instructions that are configured to cause a computer system to add contacts and selectively authenticate a third-party platform by causing a processor of a first user device to perform a method including steps, comprising:
   the user device creating a network account signified by a human readable identifier, wherein account creation includes a server assigning a unique device identifier to the user device and associating the unique device identifier with the human readable identifier in a database, where the unique device identifier is hidden from a first user of the first user device;
   the user device prompting the first user to add contacts, where human readable identifiers are used to identify added contacts to the first user;
   the user device selectively authenticating the third-party platform by:
      selectively opening the third-party platform on a user device;
      opening an authentication platform on the first user device, wherein on the authentication platform the human readable identifier is associated with the unique device identifier;
      receiving, by the authentication platform, a first session identifier for a session on the third-party platform;
      presenting a login request to the first user via a first user interface for the authentication platform to confirm the authenticated session on the third-party platform; and
      upon confirmation by the first user via the first user interface, authenticating the third-party platform by:
         sending, using the authentication platform, the session identifier and unique device identifier to the server; and
         associating, at the server, the session identifier and the unique device identifier.

2. The non-transitory computer readable medium including instructions that are configured to cause a computer system to add contacts and selectively authenticate the first user on the third-party platform by performing the method of claim 1, further comprising:
   providing access to the third-party platform to interact with at least one contact stored in non-transitory computer-readable memory of the first user device.

3. The non-transitory computer readable medium including instructions that are configured to cause a computer system to add contacts and selectively authenticate the first user by performing the method of claim 2, wherein receiving the first session identifier further comprises:
the first user device generating the first session identifier.

4. The non-transitory computer readable medium including instructions that are configured to cause a computer system to add contacts and selectively authenticate the first user on the third-party platform by performing the method of claim 1, wherein receiving the first session identifier further comprises:
receiving the first session identifier in response to transmitting a request to a server associated with the authentication platform via a computer network, and
wherein the server generates the first session identifier.

5. The non-transitory computer readable medium including instructions that are configured to cause a computer system to add contacts and selectively authenticate the first user by performing the method of claim 1, wherein receiving the first session identifier further comprises:
the first user device generating the first session identifier.

6. The non-transitory computer readable medium including instructions that are configured to cause a computer system to add contacts and selectively authenticate the first user by performing the method of claim 1, wherein the third-party platform is a website, accessible via connection over a computer network.

7. The non-transitory computer readable medium including instructions that are configured to cause a computer system to add contacts and selectively authenticate the first user by performing the method of claim 1, wherein the third-party platform is an application stored in non-transitory memory on the first user device.

8. The non-transitory computer readable medium including instructions that are configured to cause a computer system to add contacts and selectively authenticate the first user by performing the method of claim 1, wherein the first session identifier is a barcode that the user can scan using a camera of the first user device.

9. The non-transitory computer readable medium including instructions that are configured to cause a computer system to add contacts and selectively authenticate the first user by performing the method of claim 1, further comprising:
discarding the first session identifier upon a user logging out of the third-party platform.

* * * * *